United States Patent
Jeddeloh

(12) 
(10) Patent No.: US 6,425,044 B1
(45) Date of Patent: *Jul. 23, 2002

(54) APPARATUS FOR PROVIDING FAST MEMORY DECODE USING A BANK CONFLICT TABLE

(75) Inventor: Joseph M. Jeddeloh, Minneapolis, MN (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 09/352,723

(22) Filed: Jul. 13, 1999

(51) Int. Cl.⁷ ............................. G06F 12/06; G06F 9/00
(52) U.S. Cl. ......................... 711/5; 711/150; 711/163; 711/168
(58) Field of Search ..................... 711/5, 150, 163, 711/168

(56) References Cited

U.S. PATENT DOCUMENTS

| | | | | |
|---|---|---|---|---|
| 5,559,970 A | * | 9/1996 | Sharma | 395/312 |
| 5,875,470 A | * | 2/1999 | Dreibelbis et al. | 711/147 |
| 6,081,873 A | * | 6/2000 | Hetherington et al. | 711/131 |
| 6,298,413 B1 | * | 10/2001 | Christenson | 711/106 |

* cited by examiner

Primary Examiner—Matthew Kim
Assistant Examiner—Pierre M. Vital
(74) Attorney, Agent, or Firm—Park, Vaughan & Fleming LLP

(57) ABSTRACT

One embodiment of the present invention provides a system that rapidly determines whether a bank conflict exists during a memory access operation. The system includes an input that receives an address as part of the memory access operation. The system also includes a bank conflict table including an entry for each bank of memory in the computer system. Each entry indicates whether a corresponding bank of memory is presently busy servicing a memory request. The bank conflict table includes a lookup mechanism that is configured to use the address to identify a target bank of memory to which the memory access operation is directed, and to look up an entry for the target bank of memory in the bank conflict table. The system also includes a request issuing mechanism that is configured to immediately issue the memory access operation to the target bank of memory if the entry indicates that the target bank is not busy. Otherwise, the request issuing mechanism stalls the memory access operation until the target bank becomes available. In one embodiment of the present invention, upon issuing the memory access operation to the target bank of memory, the memory request issuing mechanism is further configured to set the entry corresponding to the target bank of memory in the bank conflict table so that subsequent memory access operations will detect that the target bank of memory is busy. After the memory request is complete, the memory request issuing mechanism is further configured to reset the entry for the target bank of memory in the bank conflict table so that subsequent memory access operations will detect that the target bank of memory is not busy.

18 Claims, 5 Drawing Sheets

APPARATUS FOR PROVIDING FAST MEMORY DECODE USING A BANK CONFLICT TABLE

RELATED APPLICATION

The subject matter of this application is related to the subject matter in a co-pending non-provisional application by the same inventor(s) as the instant application and filed on the same day as the instant application entitled, "Method for Providing Fast Memory Decode Using Bank Conflict Table," having Ser. No. 09/352,722, and filing date Jul. 13, 1999.

BACKGROUND

1. Field of the Invention

The present invention relates to memory systems for computers. More particularly, the present invention relates to the design of a memory interface that maintains a table indicating which banks of memory are currently in use so that during a memory access the system can rapidly determine if a bank conflict exists.

2. Related Art

As processor speed continually increase, memory systems are under increasing pressure to provide data at faster rates. This has recently led to the development of new memory system designs. Memory latencies have been dramatically decreased by using page mode and extended data out (EDO) memory designs, which achieve a high burst rate and low latencies within a single page of memory. Another recent innovation is to incorporate a synchronous clocked interface into a memory chip, thereby allowing data from within the same page of memory to be clocked out of the memory in a continuous stream. Such memory chips, with clocked interfaces are known as synchronous random access memories.

As memory latencies decrease, address decoding time is becoming a significant factor in limiting memory system performance. In many computer systems, memory is comprised of a plurality of banks, each one of which is able to service memory requests independently of other banks. Hence, it is possible to issue a memory request to a bank that is not busy while other banks are busy processing preceding memory requests. This bank-level parallelism can greatly improve system performance.

However, in memory systems with multiple banks extra memory decoding time is often required to determine if a bank conflicts exists. A bank conflict occurs when a memory access operation attempts to access a bank that is busy servicing a preceding memory request. Systems typically test for bank conflicts by comparing an address for a current request against all outstanding requests to determine if the current request is directed to a bank that is busy processing an outstanding memory request. If so, the system does not issue the current request to the bank until the bank becomes free.

Unfortunately, the additional decoding time required to check for bank conflicts can offset the performance gained by accessing memory banks in parallel. What is needed is a method and an apparatus that reduces the decoding time required to determine if a bank conflict exists.

SUMMARY

One embodiment of the present invention provides a system that rapidly determines whether a bank conflict exists during a memory access operation. The system includes an input that receives an address as part of the memory access operation. The system also includes a bank conflict table including an entry for each bank of memory in the computer system. Each entry indicates whether a corresponding bank of memory is presently busy servicing a memory request. The bank conflict table includes a lookup mechanism that is configured to use the address to identify a target bank of memory to which the memory access operation is directed, and to look up an entry for the target bank of memory in the bank conflict table. The system also includes a request issuing mechanism that is configured to immediately issue the memory access operation to the target bank of memory if the entry indicates that the target bank is not busy. Otherwise, the request issuing mechanism stalls the memory access operation until the target bank becomes available.

In one embodiment of the present invention, upon issuing the memory access operation to the target bank of memory, the memory request issuing mechanism is further configured to set the entry corresponding to the target bank of memory in the bank conflict table so that subsequent memory access operations will detect that the target bank of memory is busy. In a variation on this embodiment, the memory request issuing mechanism is further configured to: issue a RAS signal to the target bank of memory; issue a CAS signal to the target bank of memory; and issue a precharge signal to the target bank of memory. (Note that this precharge operation can also be accomplished by using a CAS signal with an autoclose command.) After issuing the RAS signal and the CAS signal, the memory request issuing mechanism is further configured to reset the entry for the target bank of memory in the bank conflict table so that subsequent memory access operations will detect that the target bank of memory is not busy;

In one embodiment of the present invention, the lookup mechanism includes circuitry that uses the address to identify the target bank of memory while the address is in transit through a core logic unit, and before the address arrives at a memory controller.

In one embodiment of the present invention, the bank conflict table is located in the memory controller.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computer System

Figure 1:
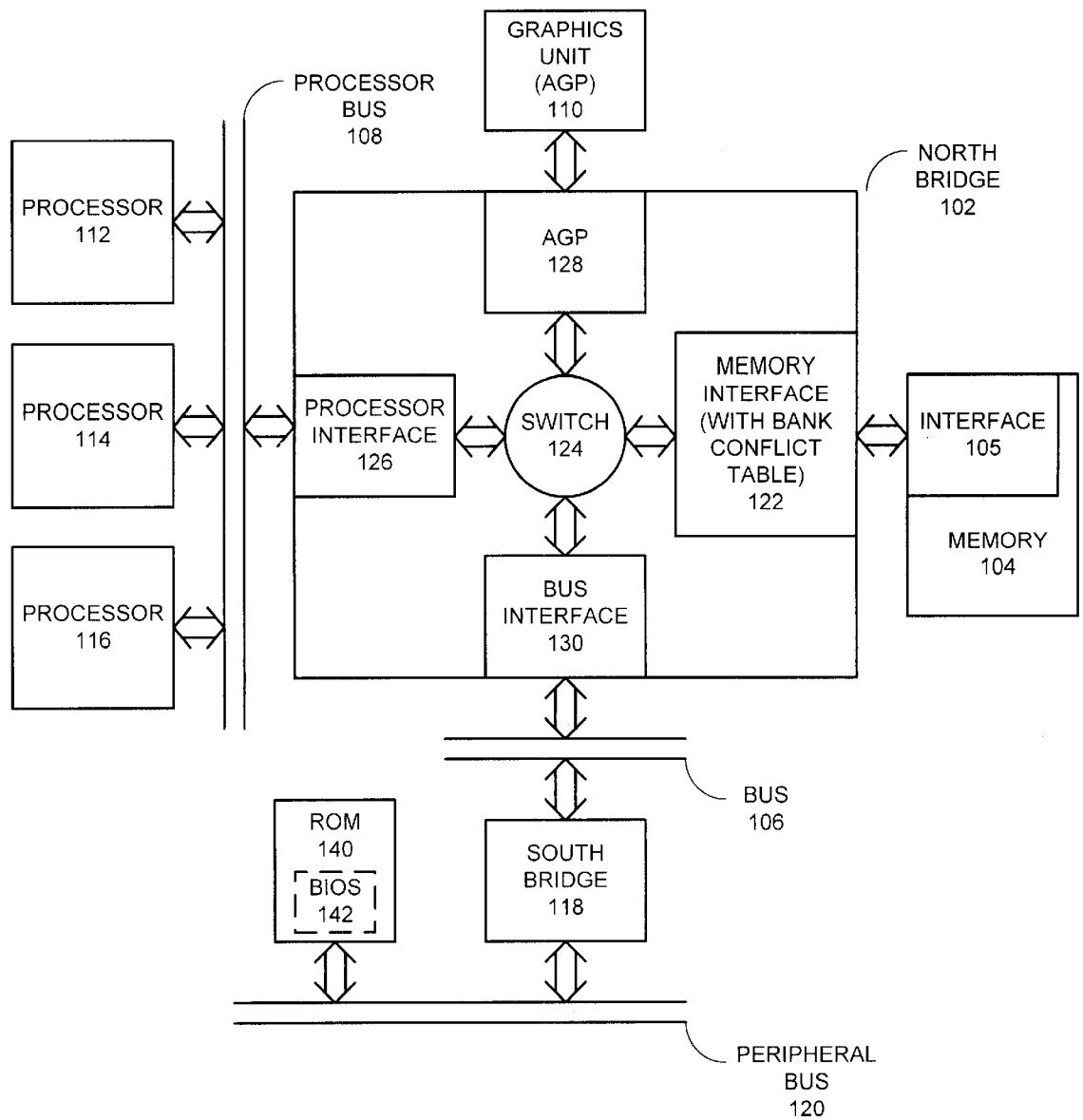
FIG. 1 illustrates a computer system in accordance with an embodiment of the present invention.

FIG. 1 illustrates a computer system including a random access memory in accordance with an embodiment of the present invention. The computer system illustrated in FIG. 1 includes processors 112, 114 and 116, which are coupled to processor bus 108. Processors 112, 114 and 116 may include any type of general or special purpose processors, including, but not limited to microprocessors, mainframe computers, digital signal processors, graphics processors and device controllers. Processor bus 108 may be any type of communication channel for coupling a processor to other devices in the computer system, including peripheral devices, memory devices and other processors.

North bridge 102 couples processor bus 108 to memory 104, graphics unit 110 and bus 106. As illustrated in FIG. 1, north bridge 102 contains: processor interface 126 for communicating with processor bus 108; accelerated graphics port (AGP) 128 for communicating with graphics unit 110; memory interface 122 for communicating with memory 104; and bus interface 130 for communicating with bus 106. Interfaces 126, 128, 122 and 130 are coupled together through switch 124, which can be any type of switching circuitry that is able to selectively couple together to interfaces 126, 128, 122 and 130.

Memory 104 may be any type of memory made up of a plurality of banks. As illustrated in FIG. 1, memory 104 includes interface 105, which interacts with memory interface 122 in north bridge 102 to send data to and receive data from north bridge 102.

Graphics unit 110 can include any special-purpose circuitry for performing graphics operations. This allows graphics computations to be off-loaded from processors 112, 114 and 116.

Bus 106 couples north bridge 102 to south bridge 118. Bus 106 may include any type of communication channel for coupling north bridge 102 to other devices in a computer system, including peripheral devices and memory devices. In one embodiment of the present invention, bus 106 is a PCI bus.

South bridge 118 includes circuitry for coupling together components of the computer system. More, particularly, south bridge 118 couples bus 106 to peripheral bus 120.

Peripheral bus 120 may include any type of communication channel for coupling a south bridge 118 to other devices in a computer system, including peripheral devices and memory devices. In one embodiment of the present invention, peripheral bus 120 is an ISA bus. Peripheral bus 120 is coupled to ROM 140, which contains BIOS 142.

The system illustrated in FIG. 1 operates as follows. A processor, such as processor 112, performs a read operation. This read operation is relayed across processor bus 108 into memory interface 122 within north bridge 102. Memory interface 122 sends a read request to interface 105 within memory 104. Interface 105 returns the read data to memory interface 122. Next, the read operation is completed by transferring data across processor bus 108 to processor 112.

Figure 2:
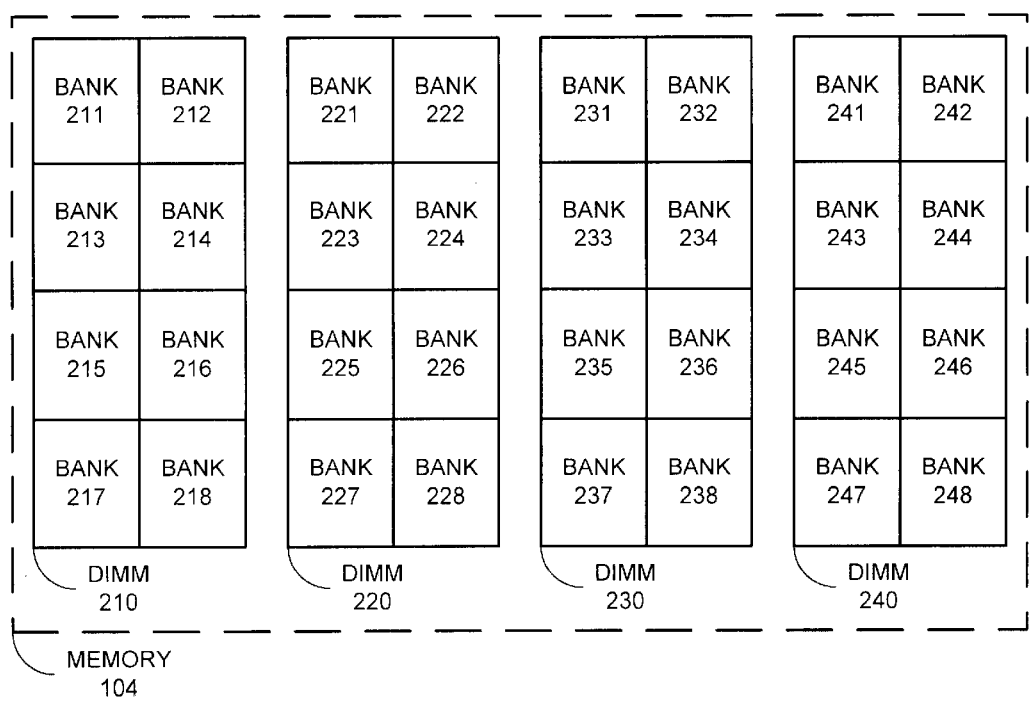
FIG. 2 illustrates a memory including multiple banks of memory in accordance with an embodiment of the present invention.

FIG. 2 illustrates how memory 104 from FIG. 1 includes multiple banks of memory in accordance with an embodiment of the present invention. Memory 104 is made up of a number of dual in-line memory modules (DIMMS) 210, 220, 230 and 240. Each DIMM includes a number of banks on each side. More specifically, DIMM 210 has four banks 211, 213, 214 and 215 on the left side, and four banks 212, 214, 216 and 218 on the right side. DIMM 220 has four banks 221, 223, 224 and 225 on the left side, and four banks 222, 224, 226 and 228 on the right side. DIMM 230 has four banks 231, 233, 234 and 235 on the left side, and four banks 232, 234, 236 and 238 on the right side. DIMM 240 has four banks 241, 243, 244 and 245 on the left side, and four banks 242, 244, 246 and 248 on the right side.

Each bank of memory includes its own set of sense amplifiers. This allows each bank of memory to service a read request or write request independently from the other banks of memory. For example, at a single point in time bank 211 may be servicing a first read request while bank 216 is servicing a second read request and bank 237 is servicing a first write request. Note that conflicts can arise if a memory request is directed to a bank that is presently busy servicing a request.

Also note that a large number of different memory configurations are possible. For example, the number of DIMMs can vary and the number of banks on each side of each DIMM can vary. Also note that the memory may include different sizes of memory chips and different memory technologies. Furthermore, a single memory system may include DIMMs and banks of memory of differing sizes.

Figure 3:
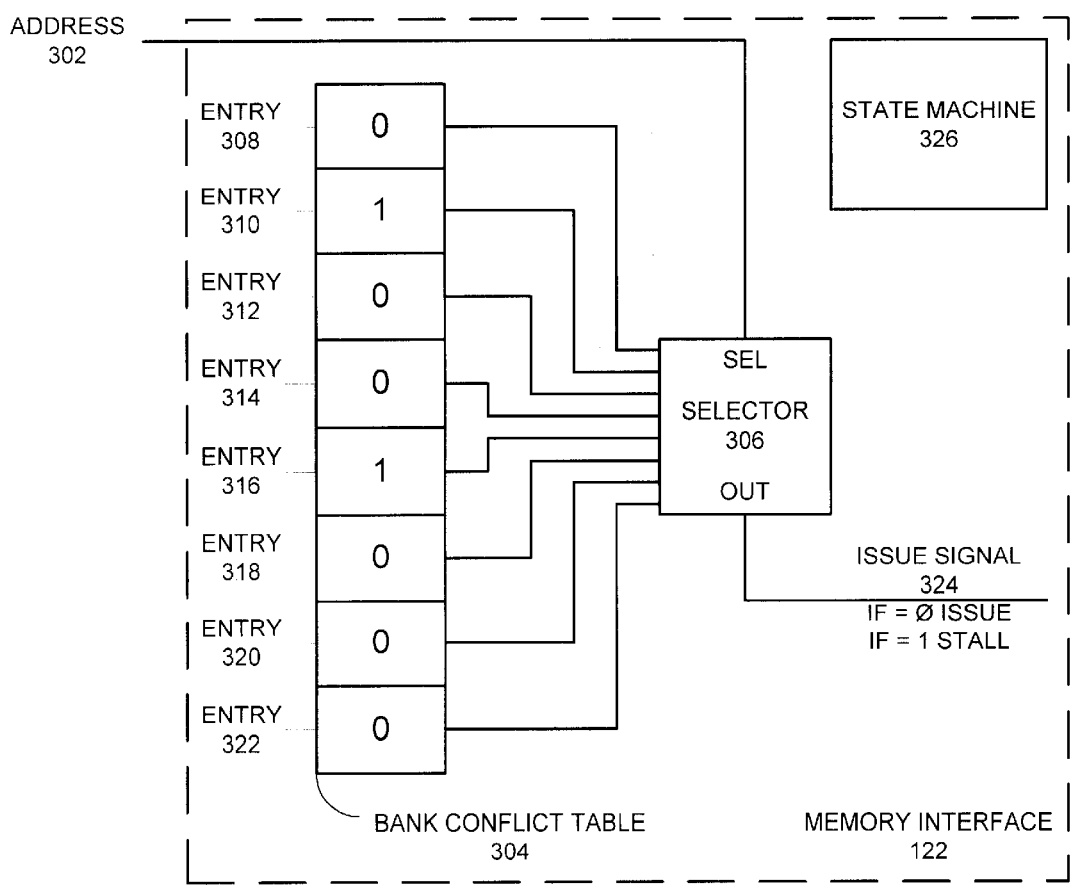
FIG. 3 illustrates circuitry that uses an address to look up an entry in a bank conflict table in accordance with an embodiment of the present invention.

Bank Conflict Detection Circuitry FIG. 3 illustrates circuitry that uses an address to look up an entry in a bank conflict table in accordance with an embodiment of the present invention. Note that this circuitry resides within memory interface 122 from FIG. 1. Memory interface 122 includes bank conflict table 304, selector circuit 306 and state machine 326.

Bank conflict table 304 includes an entry containing a single bit for each bank of memory in the computer system. The bank conflict table illustrated in FIG. 4 includes eight entries, 308, 310, 312, 314, 316, 318, 320 and 322, corresponding to eight banks of memory. If an entry is set in bank conflict table 304, this indicates that the corresponding bank of memory is busy processing a memory request. If an entry is not set, this indicates that the corresponding bank is not busy. For example, the fact that entries 310 and 316 are set within bank conflict table 304 indicates that the corresponding banks of memory are busy servicing memory requests. When a new memory request is received, memory interface 122 looks up a bit in bank conflict table 304 to determine if a bank conflict exists, This is much faster than the conventional time-consuming task of comparing the request address with all of the currently active memory requests.

Selector circuit 306 selects a particular entry from bank conflict table 304. In one embodiment of the present invention where all banks of memory are the same size, selector circuit 306 is a multiplexer that selects an entry within bank conflict table 304 based upon the higher order bits of address 302. Note that if all banks of memory are of the same power-of-two size, the higher order bits of address 302 can form an identifier for a target bank of memory to which the address is directed. These higher order bits feed directly into select inputs of selector circuit 306 to select a particular entry from bank conflict table 304.

In one embodiment of the present invention, a decoding portion of selector circuit 306 is not located within memory interface 122, but is instead located downstream at some location within north bridge 102 outside of memory interface 122. This allows the decoding portion of the selection process to be initiated while the address is in transit across north bridge 102.

Note that selector circuit 306 produces issue signal 324. If issue signal 324 has a one value, the target bank is busy. In this case, memory interface 122 stalls the memory request until the target bank becomes available. If issue signal 324 has zero value, the target bank is not busy. In this case, memory interface 122 immediately issues the memory request to the target bank.

Process of Using Bank Conflict Table

Figure 4:
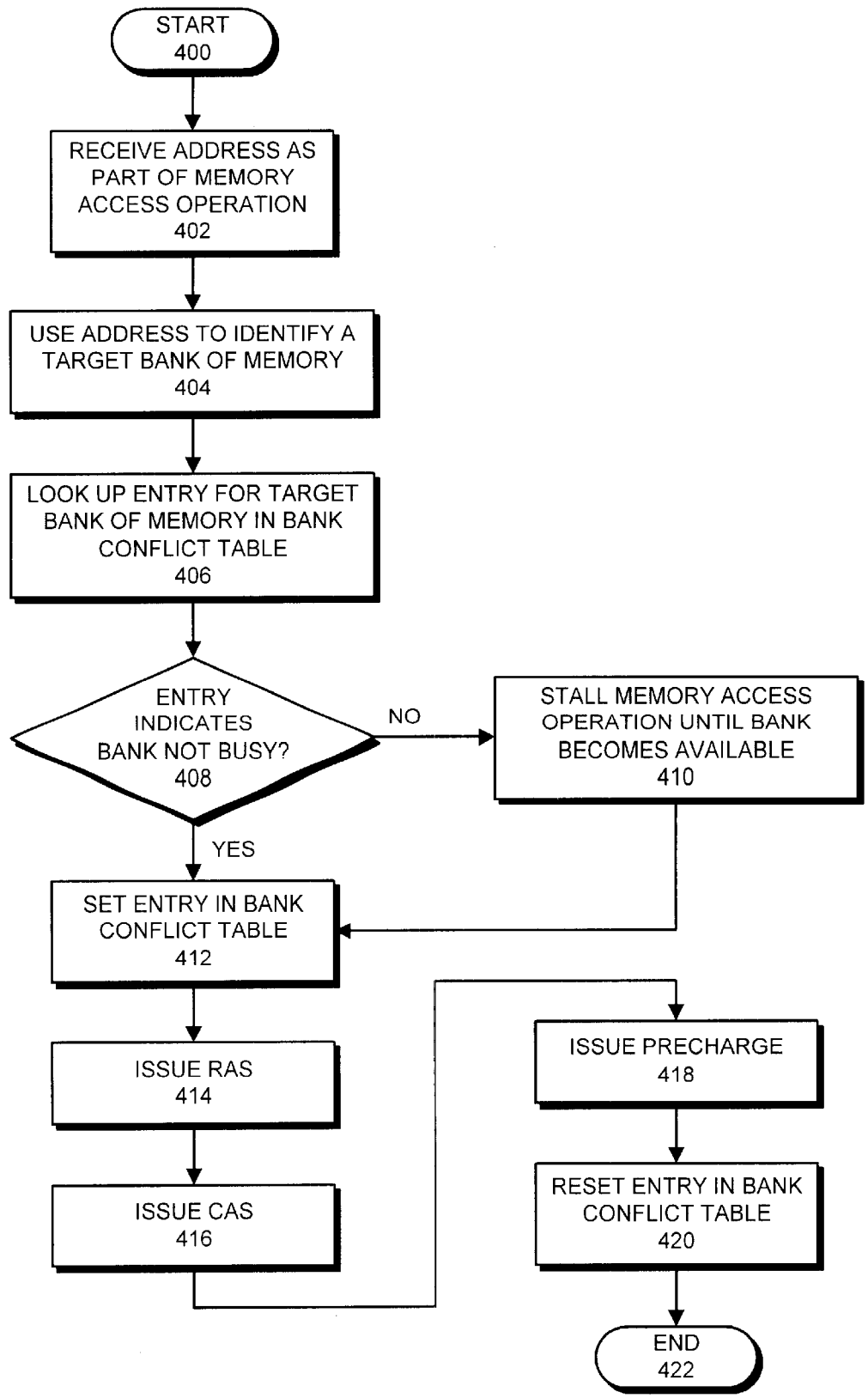
FIG. 4 is a flow chart illustrating the process of using a bank conflict table to detect bank conflicts in accordance with an embodiment of the present invention.

FIG. 4 is a flow chart illustrating the process of using a bank conflict table to detect bank conflicts in accordance with an embodiment of the present invention. The system first receives an address from a processor as part of a memory access operation (step 402). Note that this memory access operation may either be a read operation or a write operation. Next, the system uses the address to identify a target bank of memory (step 404). In one embodiment of the present invention where all of the banks of memory are of the same power-of-two size, the upper bits of the address serve as an identifier for the target bank of memory.

Next, the system uses the identifier to look up an entry within bank conflict table 304 corresponding to the target bank of memory (step 406). The system uses this entry to determine whether or not the target bank of memory is busy (step 408). If the target bank is busy processing a memory request, the system stalls the memory request until the target bank becomes available (step 410).

Otherwise, the system immediately begins issuing the memory request to the target bank. This involves setting the entry for the target bank in the bank conflict table (step 412) so that subsequent memory access operations will detect that the target bank of memory is busy. Next, the system issues a RAS (row address) to the target bank (step 414); issues a CAS (column address) to the target bank step (step 416); and then issues a precharge to the target bank (step 418). Note that the RAS, CAS and precharge cycles are standard portions of a conventional memory operation. After the memory operation is complete, the system resets the corresponding entry in bank conflict table 304 so that subsequent memory access operations will detect that the target bank of memory is not busy (step 420).

State Diagram for Issuing Memory Request

Figure 5:
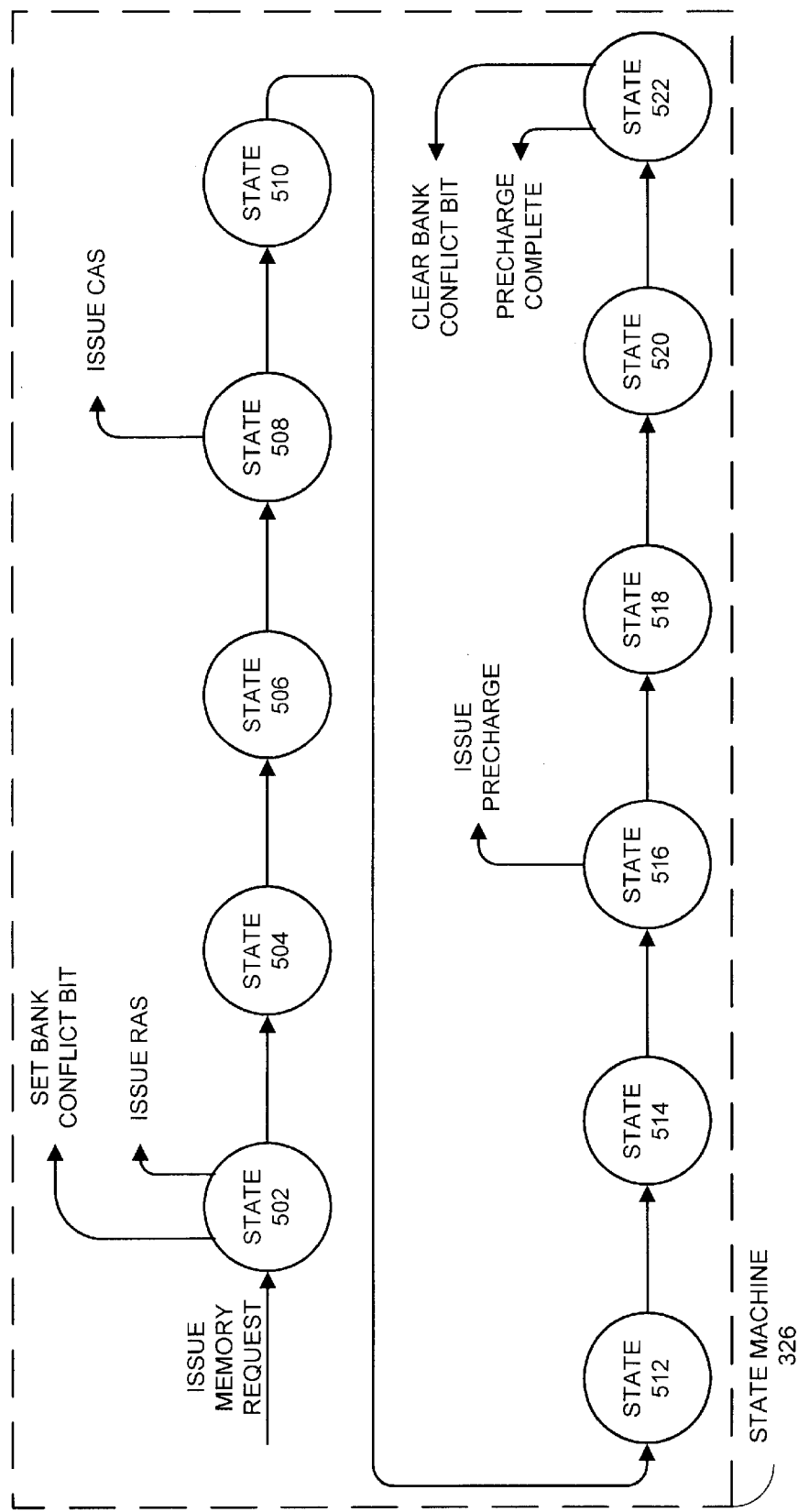
FIG. 5 illustrates part of the state diagram for a state machine that controls the issuing a memory request in accordance with an embodiment of the present invention.

FIG. 5 illustrates part of the state diagram for state machine 326 (from FIG. 3) that controls the issuing of a memory request in accordance with an embodiment of the present invention. This portion of the state diagram handles steps 412 through 420 from the state diagram in FIG. 4. In order to issue a memory request, state machine 326 sets the bank conflict bit corresponding to the target bank of memory and issues a RAS to the target bank of memory (in state 502). After three additional clock ticks (in state 508), the system issues a CAS to the target bank of memory. After several additional clock ticks (in state 516), the system issues a precharge to the target bank of memory. (Note that this precharge operation can also be accomplished by using a CAS signal with an autoclose command.) Finally, after several more clock ticks the precharge is complete and the system clears the bank conflict bit when (state 522). Note that in another embodiment of the present invention the bank conflict bit can be cleared earlier (in state 516), so that subsequent memory references can commence immediately after the precharge completes.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. An apparatus that rapidly determines whether a bank conflict exists during a memory access operation to a memory including a plurality of banks of memory, the apparatus comprising:
    an input that receives an address as part of the memory access operation;
    a bank conflict table including an entry for each bank in the plurality of banks of memory, each entry indicating whether a corresponding bank of memory is presently busy servicing a memory request;
    a lookup mechanism for the bank conflict table that is configured to use the address to identify a target bank of memory to which the memory access operation is directed from the plurality of banks of memory, and to look up an entry for the target bank of memory in the bank conflict table, wherein the lookup mechanism includes circuitry that uses the address to identify the target bank of memory while the address is in transit through a core logic unit, and before the address arrives at a memory controller; and
    a memory request issuing mechanism that is configured to,
        immediately issue the memory access operation to the target bank of memory if the entry indicates that the target bank is not busy, and to
        stall the memory access operation until the target bank becomes available if the entry indicates that the target bank is busy.

2. The apparatus of claim 1, wherein upon issuing the memory access operation to the target bank of memory, the memory request issuing mechanism is further configured to set the entry for the target bank of memory in the bank conflict table so that subsequent memory access operations will detect that the target bank of memory is busy.

3. The apparatus of claim 2, wherein upon issuing the memory access operation to the target bank of memory, the memory request issuing mechanism is further configured to:
    issue a RAS signal to the target bank of memory; and
    issue a CAS signal to the target bank of memory.

4. The apparatus of claim 3, wherein after issuing the RAS signal and the CAS signal, the memory request issuing mechanism is further configured to reset the entry for the target bank of memory in the bank conflict table so that subsequent memory access operations will detect that the target bank of memory is not busy.

5. The apparatus of claim 1, further comprising:
    a core logic unit in a computer system; and
    a memory controller within the core logic unit that is coupled to the memory, the memory controller including the memory request issuing mechanism.

6. The apparatus of claim 5, wherein the bank conflict table is located in the memory controller.

7. The apparatus of claim 1, wherein the lookup mechanism is configured to use a set of higher order bits of the address to identify the target bank of memory.

8. The apparatus of claim 7, wherein the lookup mechanism is configured to use the set of higher order bits of the address to lookup the entry in the bank conflict table.

9. The apparatus of claim 1, wherein the plurality of banks of memory includes banks of memory of differing sizes.

10. The apparatus of claim 1, wherein all banks of memory in the plurality of banks of memory have the same size.

11. The apparatus of claim 1, wherein each bank of memory in the plurality of banks of memory includes its own set of sense amplifiers.

12. The apparatus of claim 11, wherein multiple banks of memory are located in a single dual in-line memory module (DIMM).

13. The apparatus of claim 1, wherein the memory access operation is one of a read operation and a write operation.

14. An apparatus that rapidly determines whether a bank conflict exists during a memory access operation to a memory including a plurality of banks of memory, the apparatus comprising:
- an input that receives an address as part of the memory access operation;
- a bank conflict table including an entry for each bank in the plurality of banks of memory, each entry indicating whether a corresponding bank of memory is presently busy servicing a memory request;
- a lookup mechanism for the bank conflict table that is configured to use the address to identify a target bank of memory to which the memory access operation is directed from the plurality of banks of memory, and to look up an entry for the target bank of memory in the bank conflict table, wherein the lookup mechanism includes circuitry that uses the address to identify the target bank of memory while the address is in transit through a core logic unit, and before the address arrives at a memory controller; and
- a memory request issuing mechanism that is configured to,
  - immediately issue the memory access operation to the target bank of memory if the entry indicates that the target bank is not busy, and to
  - stall the memory access operation until the target bank becomes available if the entry indicates that the target bank is busy;
- wherein upon issuing the memory access operation to the target bank of memory, the memory request issuing mechanism is further configured to,
  - set the entry for the target bank of memory in the bank conflict table so that subsequent memory access operations will detect that the target bank of memory is busy,
  - issue a RAS signal to the target bank of memory, and issue a CAS signal to the target bank of memory; and
- wherein after issuing the RAS signal and the CAS signal, the memory request issuing mechanism is further configured to reset the entry for the target bank of memory in the bank conflict table so that subsequent memory access operations will detect that the target bank of memory is not busy.

15. The apparatus of claim 14, further comprising:
- a core logic unit in a computer system; and
- a memory controller within the core logic unit that is coupled to the memory, the memory controller including the memory request issuing mechanism.

16. The apparatus of claim 14, wherein each bank of memory in the plurality of banks of memory includes its own set of sense amplifiers.

17. The apparatus of claim 14, wherein the memory access operation is one of a read operation and a write operation.

18. A computer system that rapidly determines whether a bank conflict exists during a memory access operation, comprising:
- a processor;
- a memory including a plurality of banks of memory;
- a memory controller that couples the processor to the memory;
- an input within the memory controller that receives an address as part of the memory access operation from the processor;
- a bank conflict table within the memory controller including an entry for each bank in the plurality of banks of memory, each entry indicating whether a corresponding bank of memory is presently busy servicing a memory request;
- a lookup mechanism for the bank conflict table that is configured to use the address to identify a target bank of memory to which the memory access operation is directed from the plurality of banks of memory, and to look up an entry for the target bank of memory in the bank conflict table, wherein the lookup mechanism includes circuitry that uses the address to identify the target bank of memory while the address is in transit through a core logic unit, and before the address arrives at a memory controller; and
- a memory request issuing mechanism within the memory controller that is configured to,
  - immediately issue the memory access operation to the target bank of memory if the entry indicates that the target bank is not busy, and to
  - stall the memory access operation until the target bank becomes available if the entry indicates that the target bank is busy.

* * * * *